United States Patent [19]

Bruder

[11] Patent Number: 5,428,501
[45] Date of Patent: Jun. 27, 1995

[54] PACKAGING STRUCTURE AND METHOD FOR SOLID ELECTROLYTE CAPACITORS

[75] Inventor: John F. Bruder, Phoenix, Ariz.

[73] Assignee: Marine Mechanical Corporation, Cleveland, Ohio

[21] Appl. No.: 106,306

[22] Filed: Aug. 13, 1993

[51] Int. Cl.⁶ .......................... H01G 9/08; H01G 9/155
[52] U.S. Cl. ..................................... 361/535; 361/502; 361/541
[58] Field of Search .......................... 361/502, 517–500, 361/522, 535–539, 541

[56] References Cited

U.S. PATENT DOCUMENTS

| | | | |
|---|---|---|---|
| 2,582,973 | 1/1952 | Ellis | 361/536 |
| 3,443,997 | 5/1969 | Argoe et al. | |
| 3,476,605 | 11/1969 | Owens | |
| 3,476,606 | 11/1969 | Owens | |
| 3,503,810 | 3/1970 | Grocs | |
| 3,647,549 | 3/1972 | Christie et al. | |
| 3,663,299 | 5/1972 | Owens et al. | |
| 3,701,685 | 10/1972 | Ervin, III | |
| 4,313,084 | 1/1982 | Hosokawa et al. | 361/502 |
| 4,585,700 | 4/1986 | Johnson et al. | 361/504 |
| 5,136,478 | 8/1992 | Bruder et al. | |
| 5,150,283 | 9/1992 | Yoshida et al. | 361/502 |
| 5,227,960 | 7/1993 | Kunishi et al. | 361/502 |

FOREIGN PATENT DOCUMENTS

| | | | |
|---|---|---|---|
| 1-73710 | 3/1989 | Japan | 361/502 |
| 2-32519 | 2/1990 | Japan | 361/502 |
| 4-206809 | 7/1992 | Japan | 361/502 |

OTHER PUBLICATIONS

"Applications of Halogenide Solid Electrolytes", by B. B. Owens, J. E. Oxley, and A. F. Sammells, pp. 67–104.
"A Solid State Eletrochemical Capacitor", J. E. Oxley, Abstract No. 175. pp. 446–447.
"Solid State Energy Storage Device", by J. E. Oxley, Session on Secondary Batteries, pp. 20–23.
"Solid Electrolyte Batteries", by B. B. Owens, pp. 28–30.

*Primary Examiner*—Bruce A. Reynolds
*Assistant Examiner*—Gregory L. Mills
*Attorney, Agent, or Firm*—Cahill, Sutton & Thomas

[57] ABSTRACT

A solid electrolyte capacitor cell includes a cathode contact layer, a cathode layer of carbon and $RbAg_4I_5$ surrounded by a peripheral portion of the cathode contact layer, a larger electrolyte layer of $RbAg_4I_5$ attached to the cathode layer, and an anode layer of carbon and $RbAg_4I_5$, an anode contact layer, and an insulative, annular silver barrier extending between and contacting peripheral portions of the cathode contact layer, the anode contact layer, and edges of the cathode, electrolyte, and anode layers to prevent silver migration. A composite capacitor includes a plurality of the series-connected solid electrolyte cells stacked in an elastic housing that maintains isostatic internal pressure throughout the electrolyte layers of all of the cells, making them resistant to formation of minute cracks in all of the electrolyte layers. This prevents deposition of silver in such cracks during charge/discharge cycling and therefore prevents cathode-to-anode shorts.

17 Claims, 2 Drawing Sheets

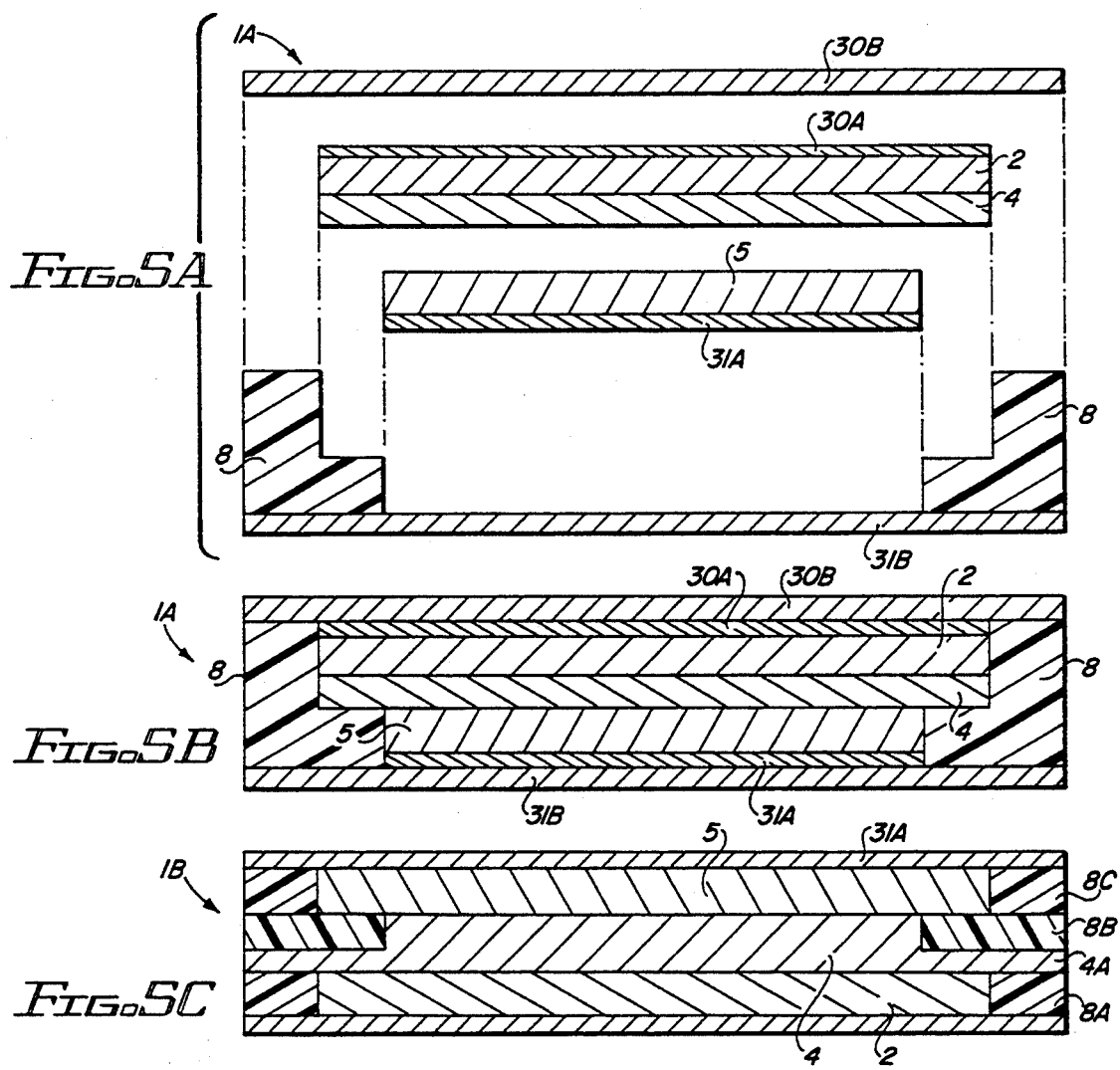
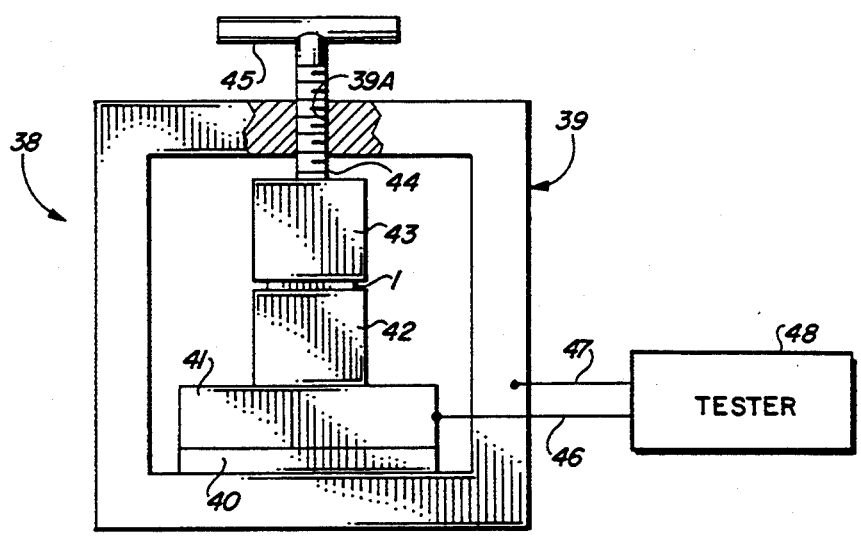

PACKAGING STRUCTURE AND METHOD FOR SOLID ELECTROLYTE CAPACITORS

BACKGROUND OF THE INVENTION

The invention relates to solid electrolyte capacitors of the type described in commonly assigned U.S. Pat. Nos. 5,136,478 (Bruder et al) issued Aug. 4, 1992 and 5,161,094 (Bruder et al), issued Nov. 3, 1992, and 5,047,899 issued Sep. 10, 1991, and more particularly to improvements in the method and structures for making and packaging such solid electrolyte capacitors.

The above-mentioned U.S. Pat. No. 5,136,478, entitled "Solid Electrolyte Capacitor and Method of Making", by Bruder et al, issued Aug. 4, 1992 is incorporated herein by reference. U.S. Pat. No. 5,136,478 discloses various solid-state electrochemical capacitors that include a layer of solid electrolyte material composed of $RbAg_4I_5$, a layer of anode material composed of carbon and $RbAg_4I_5$ adjoining a first surface of the electrolyte layer, and a layer of cathode material composed of carbon and $RbAg_4I_5$ adjoining a second surface of the electrolyte layer. A charging current charges the anode to a voltage in the range from 0.50 to 0.66 volts to cause storage of charge in both a "double layer capacitance mode" and a "pseudocapacitance mode". The charging and discharging mechanisms as presently understood are described in detail with reference to FIGS. 16A and 16B of commonly assigned U.S. Pat. No. 5,136,478. The formation of silver "dendrites" during charging and discharging cycles of a solid electrolyte capacitor is described as being problematic. The most recently preferred structure is shown in FIG. 14 of U.S. Pat. No. 5,136,478 and the charging mechanism is described in the associated text. It has proven reliable for thick cells, but for thin cells silver that forms and is extruded where the silver anode contact layer 2A contacts the anode 2Layer 2E-1 is likely to cause an anode-to-cathode short.

As efforts toward providing a commercially useful structure capable of functioning as 15 to 30 volt energy sources have progressed, additional challenges have arisen. Often, fast charging times are required for such energy sources. The individual anode-electrolyte-cathode disks described in commonly assigned U.S. Pat. No. 5,136,478 must be stacked in a unitary packaging structure to provide full charge voltage levels of 1.3 to 30 volts. To obtain satisfactorily high energy density of such an energy source, ways must be found to make each solid electrolyte capacitor disk as thin as possible while maintaining high resistance of each disk to mechanical shock, avoiding reliability problems caused by the formation of dendrites and/or migration of silver as a result of repetitive charge/discharge cycles and the resulting electrical shorting of the cathode to the anode. For some applications, maintenance of very low self-discharge rates of such energy sources is necessary. It has been discovered that when a large number of individual "cells" of the type described in commonly assigned U.S. Pat. No. 5,136,478 are stacked in a single structure to provide a high full-charge voltage, uneven self-discharge in individual cells can result in overcharging some of the cells during subsequent charging cycles, which degrades cell performance. If overcharging beyond 0.66 volts occurs or if charging too rapidly between 0.625 and 0.66 volts occurs, iodide in the electrolyte layer becomes iodine, which migrates away from the cathode to carbon surfaces, leaving the electrolyte depleted of iodide, reducing the capacitance of the cell. It would be desirable for the case or housing in which a number of individual solid electrolyte capacitor cells are stacked to have the same general appearance and electrode polarities as a conventional dry cell.

Thus, the developments described in the above-mentioned commonly assigned patents have led to a need for a rugged packaging structure and method that provides a plurality of individual solid electrolyte capacitor cells in a single package, with conventional appearance and conventional voltage polarities associated with its terminals, provides rapid charge and discharge times and high power and energy densities, and avoids the various problems mentioned above.

SUMMARY OF THE INVENTION

Accordingly, it is an object of the invention to provide a structure and method for packaging solid electrolyte capacitors of the type described in commonly assigned U.S. Pat. No. 5,136,478 which avoid deposits of silver that cause electrical shorting between the anode and cathode layers.

It is another object of the invention to provide a structure and method for packaging a plurality of solid electrolyte capacitor cells in such a manner as to avoid cracks in the electrolyte layer which form sites for deposit and migration of silver that electrically shorts the anode layer to the cathode layer.

It is another object of the invention to provide a method for making individual solid electrolyte capacitor cells as thin as possible and packaging a plurality of such cells in a single package in such a manner as to provide a high output voltage and high energy and power density.

It is another object of the invention to provide a technique and structure for making very thin, reliable solid electrolyte capacitor cells.

It is another object of the invention to provide a technique for providing uniform self-discharge of a plurality of solid electrolyte capacitor cells stacked in a single package.

It is another object of the invention to provide an energy storage device including a plurality of solid electrolyte capacitor cells stacked in a single package having fast charge and discharge times.

It is another object of the invention to provide a highly reliable, reasonably inexpensive energy storage device including a plurality of stacked solid electrolyte capacitor cells within a single package structure.

Briefly described, and in accordance with one embodiment thereof, the invention provides a solid electrolyte capacitor cell including a cathode contact layer, a first layer including carbon and $RbAg_4I_5$ attached to the cathode contact layer and surrounded by a peripheral portion of the cathode contact layer, an electrolyte layer including $RbAg_4I_5$ attached to the cathode layer, a peripheral portion of the electrolyte layer extending outwardly beyond and surrounding the cathode layer, an anode layer including carbon, platinized carbon, silver, and $RbAg_4I_5$ attached to the electrolyte layer, an anode contact layer attached to the anode layer, and an insulative, generally annular silver barrier extending between and contacting peripheral portions of the cathode contact layer and the anode contact layer, and also contacting edges of the cathode, electrolyte, and anode layers.

A composite capacitor includes a plurality of the series-connected solid electrolyte cells stacked in a housing including an elastic metal disk abutting the anode contact layer of a top cell and exerting a downward force tending to compress the cells together. The elastic metal disk forms a negative terminal of the composite capacitor. A metal disk includes a centered post portion, and abuts a cathode contact layer of a bottom cell and forms a positive terminal of the composite capacitor. An insulator includes an open upper portion and a closed lower portion, and contains the cells. The insulator includes an aperture in its lower portion, and the post portion of the metal disk extends through the first aperture. An elastic metal housing includes an open upper portion that engages and retains the elastic metal disk, and also includes a closed lower portion. The housing encloses the insulator 33, and includes an aperture through which the post extends. The upper portion of the elastic metal housing exerts inward forces against the insulator tending to compress the cells, and the lower portion of the elastic metal housing exerts upward forces tending to compress the cells. Isostatic internal pressure therefore is maintained throughout the electrolyte layers of all of the cells, making them resistant to formations of minute cracks in all of the electrolyte layers. This prevents deposition of silver in such cracks during charge/discharge cycling and therefore prevents cathode-to-anode shorts. Resistive material between the insulator electrically controls the anode contact layer and the cathode contact layer of each cell and functions to ensure an equal voltage drop across each cell, respectively, despite any differences in self-discharge rates of the various cells.

BRIEF DESCRIPTION OF THE DRAWINGS

FIGS. 5A, 5B and 5C are exploded and assembled views, respectively, of cell fabricated using techniques similar to those indicated in FIG. 3.

FIG. 6 is a diagram of a press for in situ testing of the cells of FIG. 1 during manufacture.

DETAILED DESCRIPTION OF THE PREFERRED EMBODIMENTS

Figure 1:
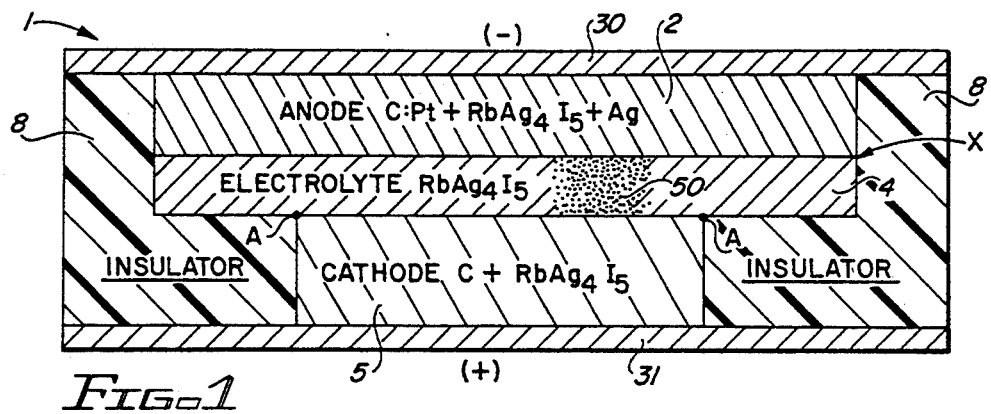
FIG. 1 is a section view of a single solid electrolyte capacitor cell constructed in accordance with the present invention.

FIG. 1 shows a solid electrolyte capacitor cell 1 including a cathode contact layer 31, which may be HASTELLOY metal (available from Hayes International, Inc.). (HASTELLOY metal is well known as corrosion resistant stainless steel material. HASTELLOY cathode contact layer 31 is approximately 0.5 mils thick. A cathode layer 5 composed of activated carbon and $RbAg_4I_5$, having a thickness in the range of 2 to 3 mils and a diameter of 0.8 inches, has one major surface electrically connected to cathode contact layer 31.

An annular insulator 8 consisting of MYLAR or glass-filled LEXAN (available from General Electric and others) abuts the side walls of cathode disk 5. Insulator 8 has an L-shaped cross sectional configuration as shown in FIG. 1. Its bottom surface abuts the upper surface of cathode contact layer 31, and is attached thereto by suitable thermosetting epoxy such as 3M SCOTCH-WELD 2290.

An electrolyte layer 4 composed of $RbAg_4I_5$, having a diameter of 0.9 inches and a thickness in the range of 2 to 3 mils, is located concentrically with respect to cathode layer 5 and is attached thereto. Shoulder 8A of annular MYLAR or LEXAN insulator 8 is at the same level as the interface surface between cathode layer 5 and electrolyte layer 4. Vertical surface 8B of insulator 8 abuts the edge surface of and has the same diameter as electrolyte layer 4. Anode layer 2 consists of platinized carbon, possibly finely divided silver, and $RbAg_4I_5$, and has the same diameter as electrolyte layer 4 and has a thickness in the range of 2 to 3 mils. Its upper surface is contacted by HASTELLOY anode contact layer 30, which can be approximately 0.5 mils thick. The upper surface of anode layer 2 is at the same level as the top surface of insulator 8, which is attached to the bottom surface of anode contact layer 30 by means of 3M SCOTCH-WELD 2290 adhesive.

During charging of solid electrolyte capacitor cell 1, cathode contact layer 31 is at a positive voltage that increases to approximately 0.5 volts relative to anode contact layer 30, producing an electric field that causes silver ions $Ag^+$ to move from electrolyte layer 4 into anode layer 2 and be deposited on the surface of the platinized carbon, on what silver may be present, and on the lower surface of anode contact layer 30. This electric field and the silver migration produced thereby tends to prevent dendrites from forming along the outer edges of the interface between electrolyte layer 4 and anode layer 2. The provision of the reduced diameter cathode layer 5 shown in FIG. 1 tends to further reduce the depositing of silver because the diameter of the path current flow through the body of the cell is limited by the diameter of cathode layer 5. Virtually no current flows near the edges of electrolyte layer 4 and anode layer 2, so no silver is formed thereat. The provision of annular insulator 8 in combination with reduced diameter cathode layer 5 tends to block migration of $Ag^+$ ions that would deposit at point X in FIG. 1 (the edge of the interface between anode layer 2 and electrolyte layer 4) and prevents Such ions from migrating circumferentially inward along the bottom surface of electrolyte layer 4 and vertically along the vertical wall of electrolyte layer 4 until the cathode is electrically short circuited to anode layer 2.

As previously mentioned, it is very desirable to make the solid electrolyte capacitor cell 1 as thin as possible (preferably as little as 10–11 mils in thickness) so many such cells can be "stacked" in series in a unitary container to provide a high voltage energy storage device. But before describing the processes which allow electrolyte layer 4 and the anode and cathode layers 2 and 5 to be made very thin, it will be helpful to describe the structure of FIG. 2, in which composite solid electrolyte capacitor 10 includes N solid electrolyte capacitor cells 1 stacked in series in a case or housing having the same general external appearance as a typical dry cell, with the same electrical polarities associated with its terminals as for a conventional dry cell. That is, the small terminal located in the center of one end of composite capacitor 10 is the positive electrode, and the entire bottom surface of the opposite end is the negative terminal.

Figure 2:
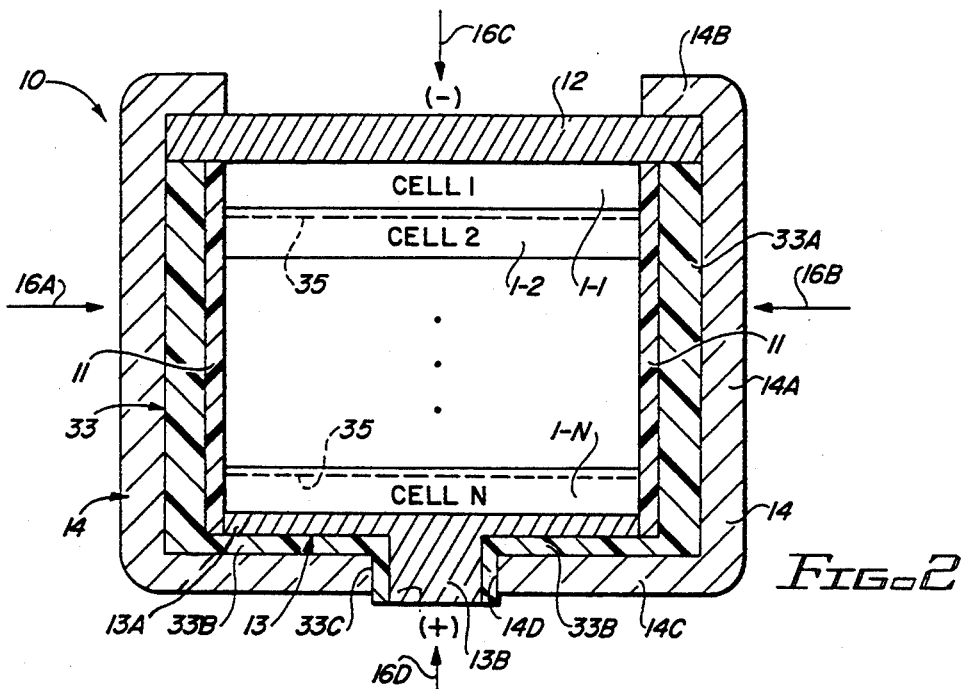
FIG. 2 is a section view of a plurality of the solid electrolyte capacitor cells of FIG. 1 packaged in a unitary structure.

In FIG. 2, reference numerals 1-1, 1-2 . . . 1-N designate N solid electrolyte capacitor cells identical to cell 1 shown in FIG. 1. The number N can be from 1 to as many as 50 cells. These cells are stacked so that all are oriented in the same direction so that the anode contact layer 30 abuts the cathode contact layer 31 of an adjacent cell. Cells 1-1 . . . 1-N are surrounded by a highly resistive self-discharge-balancing layer 11, subsequently described. Preferably, self-discharge-balancing tube 11 is composed of carbon-doped epoxy material, and is 1–5 mils thick.

A positive terminal 13 is electrically connected to the cathode contact layer 31 of cell 1-N. Positive terminal 13 includes a disk-shaped base section 13A and a post section 13B that extends to the bottom of composite solid electrolyte capacitor 10.

An insulative sleeve 33, preferably composed of LEXAN material and having a thickness of approximately 20 mils, includes a cylindrical portion 33A that fits tightly around the outer surface of self-discharge-balancing sleeve 11, thereby confining cells 1-1 . . . 1-N. Insulative sleeve 33 also has a bottom annular section 33B that bounds the bottom surface of base section 13A of positive terminal 13. Insulative sleeve 33 has a lower cylindrical section 33C through which the post section 13B of positive terminal 13 extends.

A negative terminal 12 is composed of a disk of HASTELLOY or stainless steel material having a thickness of approximately 100 mils. The bottom surface of negative terminal 12 electrically contacts the anode contact layer 30 of cell 1-1, and also abuts the upper surface or edge of insulative sleeve 33.

A HASTELLOY or stainless steel housing or case 14 encloses the entire structure described above. Housing 14 has a wall thickness of approximately 30 mils. Housing 14 includes a cylindrical section 14A, a crimped upper edge 14B that tightly retains negative anode terminal 12 tightly against the top of the stack of cells 1-1 . . . 1-N, a horizontal annular bottom section 14C, and an aperture 14D through which the bottom cylindrical portion 33C of insulative sleeve 33 and post 13B of positive terminal 13 extend.

The structure of FIG. 2 for the composite solid electrolyte capacitor 10 provides isostatic (equal from all directions) pressure on each point in the electrolyte material of each of the individual cells 1-1 . . . 1-N. More specifically, cylindrical section 14A of housing 14 and the elasticity of sleeve 33A under compression exert an inward radial pressure around the entire circumference of each of cells 1-1 . . . 1-N, as indicated, for example, by arrows 16A and 16B. Anode terminal 12, which forms a rigid top for the structure, exerts downward pressure on all of cells 1-1 . . . 1-N, as indicated by arrow 16C, and the bottom section 14C exerts upward pressure against of the cells as shown by arrow 16D. Consequently, high isostatic pressure is maintained within the electrolyte layer 4 of all of the cells 1-1 . . . 1-N. This prevents formation of minute cracks in electrolyte layers 4 which could form sites for migration and deposition of Ag+ ions and cause shorting of cathode layer 5 to anode layer 2. I estimate that the isostatic pressure can be in the range of 80,000 to 100,000 psi. If repetitive cycling is not required, the isostatic pressure can be less to reduce high pressure packaging requirements.

As mentioned above, and as also described in commonly assigned U. S. Pat. No. 5,136,478, it is desirable for electrolyte layer 4 of each of the cells to be as thin as possible, to minimize the internal resistance of each cell land thereby allow fast charging and discharging thereof. The electrolyte layer 4, made by high compression operations described in commonly assigned U.S. Pat. No. 5,136,478, is quite brittle. The thinner the electrolyte layer 4 is, the more likely it is that mechanical shock could produce minute cracks that could be preferential sites for depositing of silver ions during the above-described migration in the direction of arrow 28 of FIG. 1 during charging of the cell. That, of course, can result in electrical shorting of cathode layer 5 to the anode layer 2, destroying the cell, or at least greatly imbalancing its self-discharge rate (which also is very undesirable, especially in a composite cell structure).

Figure 4:
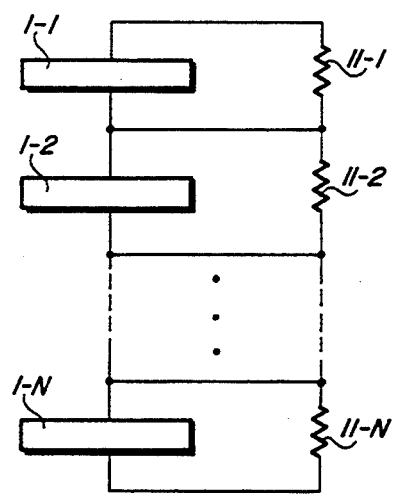
FIG. 4 is a schematic diagram illustrating the equivalent resistances of the discharge sleeve 11 in FIG. 2.

FIG. 4 shows a schematic diagram illustrating an equivalent circuit formed by cellos 1-1 . . . 1-N stacked in series as in FIG. 2 and resistive self-discharge-balancing sleeve 11, which can be insulative material such as epoxy containing a small concentration of conductive particles, such as carbon. Suppose that one or a few of the cells such as 1-2 has a self-discharge rate much greater than any of the other cells. (A high self-discharge rate may be caused by presence of minute amounts of moisture or other contamination in the electrolyte layer.) Each cell that has such a large self-discharge rate will experience a decrease in the voltage between its anode and cathode terminals, whereas cells in the stack which do not have a high self-discharge rate, maintain their full charge and a full voltage between their cathode and anode terminals. Thus, it can be appreciated that when a charging voltage equal to N times 0.65 volts is applied across the composite cell structure, an excess of 0.65 or 0.66 volts is likely to appear across some of the cells. As previously explained, such cell overvoltages in excess of 0.66 volts tends to cause decomposition of the electrolyte layer of that cell, greatly reducing its charge storage capacity.

The purpose of the self-discharge-balancing resistive sleeve 11 can be understood by considering its equivalent circuit, represented by resistors 11-1, 11-2 . . . 11-N in FIG. 4. These resistors form a uniform resistive divider that causes the terminal-to-terminal voltage of the composite cell structure to be equally divided across each of the N solid electrolyte capacitor cells 1-1, 1-2 . . . 1-N, respectively. The resistance of each of resistors 11-1 . . . 11-N is sufficiently high that the self-discharge of each cell in the composite cell structure is acceptably low for the particular application. For example, in many applications, a self-discharge current of 100 microamperes in each cell would be acceptably low in the sense that a sufficient amount of energy is stored for a sufficiently long time, yet the self-discharge current through the resistive balancing structure 11 is sufficiently high to compensate for internal self-discharge of any of the cells in the stack and thereby maintain precisely the same anode-to-cathode voltage across each. Then accidental overcharging of individual cells can not occur.

It may be practical to "salt" the electrolyte layers with carbon particles to cause a controlled internal self-discharge that would avoid the need for the external resistive sleeve 11. Numeral 50 in FIG. 1 indicates such "salting".

Figure 3:
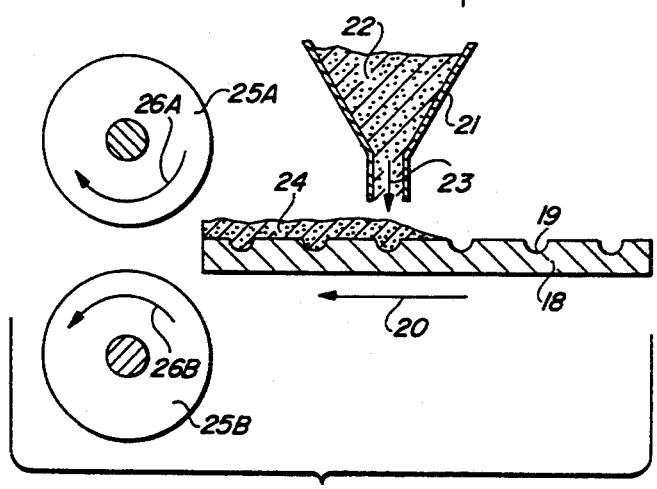
FIG. 3 is diagram useful in illustrating both the structure and method of making anode layers and cathode layers to be used in the construction of the solid electrolyte capacitor cell of FIG. 1.

FIG. 3 shows an alternate technique for batch fabricating the anode layers and the cathode layers as solid disks which then are used in a modified version of the high pressure process described in commonly assigned U.S. Pat. No. 5,136,478 to fabricate the individual cells. In FIG. 3, numeral 18 designates a thin (2 mils thick) sheet of 400 mesh stainless steel or perforated stainless steel foil or other conductive material. Conductive sheet 18 is perforated,, or has etched indentations such as 19, resulting in a "roughened" upper surface. Sheet 18 is advanced in the direction of arrow 20 by a suitable advancing machine (not shown). A hopper 21 containing powdered anode or cathode material of the types indicated in FIG. 1 is designated by numeral 22, and is metered as indicated by arrow 23 onto the roughened surface of advancing sheet 18, forming a uniform powder layer 24 of the appropriate anode or cathode material. Advancing sheet 18 with the layer 24 on it is then passed through one or more pairs of pinch rollers 25A and 25B rotating in the directions indicated b arrows 26A and 26B, respectively, applying enough pressure, for example approximately 50,000 psi, to integrate the powdered layer 24 into a solid anode or cathode layer integrated with sheet 18. Sheet 18 functions as anode contact layer or a cathode contact layer.

Anode disks or cathode disks of suitable size then are punched out of fabricated sheet 18,24 and placed in high pressure dies between measured amounts of powdered electrolyte material in order to manufacture the individual solid electrolyte capacitor cells as shown in FIG. 1.

In prototypes of cells constructed so far, the resistance of the electrolyte layer 4 is usually at least ten times greater than the resistance of the anode layer 2 and the cathode layer 5. Therefore, obtaining extremely thin electrolyte layers is critical to obtaining fast cell and composite cell discharge times. Of course, making all three layers of each cell as thin as practical is critical to obtaining individual cell structures with thicknesses as low as 8-10 mils.

My experiments to date indicate that by screening the electrolyte powder so that no particle is greater than 0.5 mils in diameter, very thin, high integrity electrolyte layers no thicker than approximately 2-3 mils can be achieved. The above-mentioned isostatic pressure packaging structure ensures that the integrity of such thin electrolyte layers is preserved that cracks that act as sites for preferential silver deposition during charging are not formed during the useful life of the composite cell structure.

During the high pressure manufacture of each individual cell, metal dies can be used to insure charge neutrality of each initial cell, so that when cells are stacked there isn't any initial charge imbalance in them.

There are various ways of making the anode disks or cathode disks of the type shown in FIG. 3. For example, by using a cylindrical die and cylindrical slugs as shown in FIG. 6A of U.S. Pat. No. 5,136,478, a cathode disk can be fabricated by positioning the top of the lower slug at a distance below the top of the die so as to determine the desired thickness of the anode material and then sprinkling anode powder to fill that value of cylindrical die, using a comb or similar structure to level the layer anode powder with the top of the die, and then placing a circular disk of roughened stainless steel material or stainless steel screen such as 18 in FIG. 3 on the layer of anode powder with the roughened features 19 in contact with the powder. The LEXAN silver barrier insulator is glued to the pre-fabricated cathode disk before it is placed in the die. Then an upper cylindrical slug is used to highly compress the anode powder and the roughened stainless steel material to thereby form a unitary anode disk. Cathode disks can be made similarly.

Then individual solid electrolyte capacitor cells can be made by placing a pre-fabricated cathode disk in a die with the stainless steel layer portion 18 facing downward, sprinkling an appropriate amount of electrolyte powder on the exposed cathode material, placing a pre-fabricated anode layer on the leveled electrolyte powder with its stainless steel layer portion 18 facing upward, and then compressing the structure at approximately 80,000 psi to form an individual cell.

FIG. 5A and 5B show cross sections of a cell 1A fabricated generally in accordance with the batch fabrication process indicated in FIG. 3. FIG. 5A shows the cell 1A in an exploded view. The cathode layer 5 is formed on a 400 mesh stainless steel or HASTELLOY screen 31A in the manner generally indicated in FIG. 3. The anode 2 is formed on a similar screen 30A in the same manner. Then, the anode/screen structure is used as a substrate on which the electrolyte layer 4 is formed in generally the same fashion as indicated in FIG. 3. Then, the cell 1A is assembled, using the MYLAR or glass-filled LEXAN, a solid top metal or anode metal cover 30B and a bottom metal cover 31B and suitable adhesives as previously mentioned. The metal covers 30B and 31B have been found to be necessary to prevent $RbAg_4I_5$ particles from breaking loose and causing difficulty. The composite structure of cell 1A is shown in FIG. 5B, except that the mesh screens 30A and 31A are not shown for convenience. FIG. 5C shows a non-optimum construction that I have made using the batch fabrication techniques indicated in FIG. 3, in which the electrolyte layer 4 extends outward as indicated by numeral 4A to the edge of cell 1B. MYLAR rings 2 mils thick are used to form the insulators 8A and 8C. MYLAR insulator 8B is 1 mil thick. Solid HASTELLOY disks 30A and 31A form the ANODE contact and CATHODE contact, respectively.

FIG. 6 shows a device that allows in situ testing of a cell 1 during fabrication, while as the above-mentioned high compression forces are being applied to it. The structure 38 shown in FIG. 6 includes a frame 39 having a threaded hole 39A in it. An electrical insulator 40 supported by a bottom side of frame 39 supports a metal base 41, on which a conductive "punch" element 42 is supported. Cell 1 is positioned between conductive punches 42 and 43. A threaded member 44 passing through threaded hole 39A is connected to a handle 45 which, when rotated, forces conductive punches 42 and 43 together, compressing cell 1. Cylindrical dies within which punches 42 AND 43 are disposed during the compressing are removed prior to testing, because they otherwise would short punches 42 and 43 together, making testing impossible. An electrical conductor 46 is attached to conductive base 41 and applied to an input of an electrical tester 48. Conductor 47 connects conductive frame 39 to tester 48, so that the electrical characteristics of cell 1 can be tested at this stage of fabrication.

The above-mentioned solid plates are necessary when screen mesh, or HASTELLOY cloth or the like are used as indicated in FIG. 2 by numerals 35. Such disks should be placed between the individual cells if the cells are fabricated with screen mesh electrodes not having solid metal covers.

I have found that the self-discharge sleeve 11 can be replaced by "salting" electrolyte 4 by suitable amounts of carbon particles to produce an internal self-discharge. In the future it is possible that this approach may be feasible.

Because the electrolyte layer 4 is so brittle (anode and cathode layers 2 and 5 on 400 mesh screen layers 30A and 31A as shown in FIGS. 5A and 5B are very flexible), it is difficult to make an electrolyte/anode subassembly disk. Possibly the electrolyte layer can be made flexible by adding binder material thereto. For example, very fine (less than 10 microns) LEXAN or other insulative powder could be added to the electrolyte powder before pressing it between die or rollers. Or, the binder possibly could be dissolved in a solution that does not adversely affect the $RbAg_4I_5$, and this solution could be combined with the $RbAg_4I_5$ and the solvent then could be removed by evaporation or other means. Chemicals that might be used to dissolve LEXAN and not disturb the $RbAg_4I_5$ include 1,2,DICHLOROETHANE, 1,2,DICHLOROMETHANE, or 1,1,1,TRICHLOROETHANE. The process might be as follows: (1) Dissolve LEXAN or other binder material that would be soluble in a solution that would not adversely affect the $RbAg_4I_5$ and would not adversely affect the $RbAg_4I_5$ after the solvent is driven off; (2) Mix the solution containing dissolved binder with $RbAg_4I_5$ in proper proportions to obtain a binder concentration of 0.1% to 20% binder to 99.9% to 80% $RbAg_4I_5$; (3) Drive off solvent by heating or vacuum drying; and (4) Pulverize $RbAg_4I_5$ and binder in preparation for pressing in a die set or pinch rollers. A thin layer of electrolyte binder may be produced by squeezing a paste of this material under very high pressure from a thin slot.

While the invention, has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A solid electrolyte capacitor cell, comprising in combination:
   (a) a positive electrode metal contact layer;
   (b) a first layer of positive electrode material including carbon and $RbAg_4I_5$ in electrical contact with the positive electrode metal contact layer and surrounded by a peripheral portion of the positive electrode metal contact layer;
   (c) a second layer of electrolyte material including $RbAg_4I_5$ attached to the first layer, a peripheral portion of the second layer extending outwardly beyond and surrounding the first layer;
   (d) a third layer of negative electrode material including carbon and $RbAg_4I_5$ attached to the second layer;
   (e) a negative electrode metal contact layer in electrical contact with the third layer; and
   (f) an electrically insulative, generally annular silver barrier extending between and contacting peripheral portions of the positive electrode metal contact layer and the negative electrode metal contact layer and also contacting the first, second and third layers.

2. The solid electrolyte capacitor cell of claim 1 wherein the positive electrode metal contact layer and the negative electrode contact layer are composed of corrosion-resistant stainless steel.

3. The solid electrolyte capacitor cell of claim 2 wherein the stainless steel is less than approximately 0.5 mils thick.

4. The solid electrolyte capacitor cell of claim 1 wherein the silver barrier is composed of plastic.

5. The solid electrolyte capacitor cell of claim 4 wherein the plastic is glass filled and is adhesively attached to the positive electrode metal contact layer and the negative electrode metal contact layer.

6. The solid electrolyte capacitor cell of claim 1 wherein the second layer is composed of electrolyte material particles substantially all of which have a diameter of less than approximately 0.5 mils.

7. The solid electrolyte capacitor cell of claim 6 wherein a thickness of the second layer is less than approximately 2 mils, and the thickness of the cell is less than approximately 10–15 mils.

8. The solid electrolyte capacitor cell of claim 1 wherein the positive electrode metal contact layer includes an inner surface with roughened features, the positive electrode material of the first layer being adherent to the roughened features of the inner surface, and wherein the negative electrode metal contact layer includes an inner surface with roughened features, the negative electrode material of the third layer being adherent to and unitary with those roughened features.

9. The solid electrolyte capacitor cell of claim 1 wherein the silver barrier has an L-shaped cross section, an upper leg of which engages side walls of the second layer and the third layer, a lower leg of which engages the peripheral portion of the second layer.

10. An energy storage device comprising in combination:
    (a) a plurality of series-connected solid electrolyte cells, each cell including
        i. a positive electrode metal contact layer;
        ii. first layer of positive electrode material including carbon and $RbAg_4I_5$ in electrical contact with the positive electrode metal contact layer and surrounded by a peripheral portion of the positive electrode metal contact metal layer;
        iii. a second layer of electrolyte material including $RbAg_4I_5$ attached to the first layer, a peripheral portion of the second layer extending outwardly beyond and surrounding the first layer;
        iv. a third layer of negative electrode material including carbon and $RbAg_4I_5$ attached to the second layer;
        v. a negative electrode metal contact layer in electrical contact with the third layer; and
        vi. an electrically insulative, generally annular silver barrier extending between and contacting peripheral portions of the positive electrode metal contact layer and the negative electrode metal contact layer and also contacting the first, second and third layers; and
    (b) a housing including;
        i. a first metal disk abutting the negative electrode metal contact layer of a top cell and exerting downward forces tending to compress the cells together, the first metal disk forming a negative terminal of the energy storage device,
        ii. a second metal disk having a centered post portion and abutting a positive electrode metal contact layer of a bottom cell and forming a positive terminal of the energy storage device,
        iii. an electrical insulator including an open upper portion and a closed lower portion and containing the cells, the insulator having a first aperture in the lower portion thereof, the post portion of the metal disk extending through the first aperture, iv. a compressive metal housing having an open upper portion engaging and retaining the elastic metal disk and having a closed lower portion and enclosing the insulator 33 and having a second aperture through which the post extends, a portion of the elastic metal housing exerting inward forces against the insulator tending to compress the cells, the lower portion of the elastic metal housing exerting upward forces tending to compress the cells.

11. The energy storage device of claim 10 including resistive material disposed between the insulator and the cells, the resistive material electrically contacting the positive electrode metal contact layer of each cell and the negative electrode metal contact layer of each cell, and the resistive material being configured to produce equal voltage drops across each of the cells.

12. The energy storage device of claim 11 wherein the resistive material includes a resistive sleeve dispersed between the cells and the insulator.

13. The energy storage device of claim 10 including resistive means for establishing an equal voltage drop across each of the cells, respectively, despite any differences in self-discharge rates of the various cells.

14. The energy storage device of claim 10 wherein the downward forces, the inward forces, and the upward forces producing isostatic pressure in the electrolyte layers in the range of approximately 80,000 to 100,000 pounds per square inch.

15. The energy storage device of claim 10 wherein the number of cells is in the range from approximately 1 to 50.

16. The energy storage device of claim 10 wherein each of the cells has a thickness that is less than approximately 10–12 mils.

17. The energy storage device of claim 10 wherein the elastic metal disk is composed of corrosion resistant stainless steel and is approximately 100 mils thick, and the elastic metal housing is composed of corrosion resistant stainless steel and is approximately 30 mils thick.

* * * * *